July 17, 1928.
L. JOYNER
CYLINDER COCK
Filed June 1, 1927        2 Sheets-Sheet 1
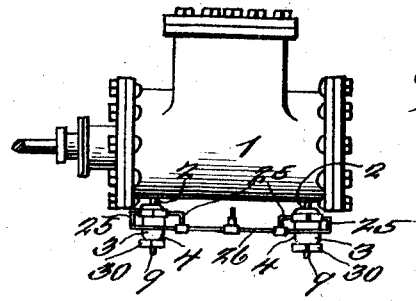
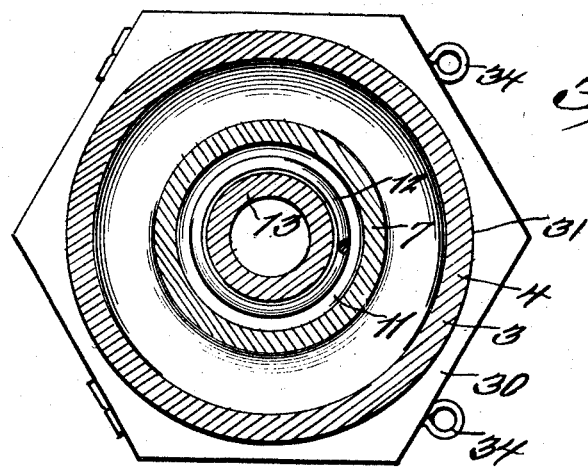
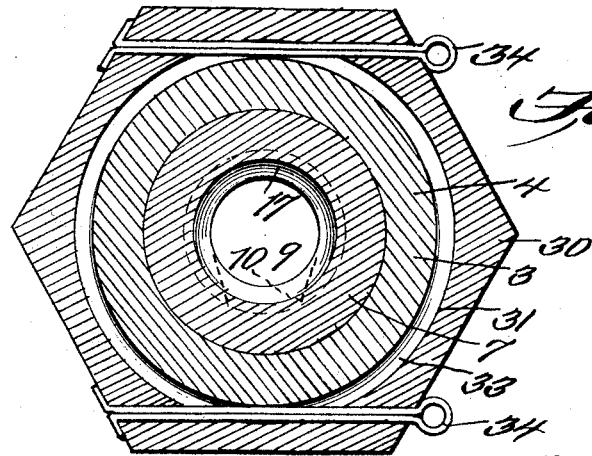
Laurie Joyner INVENTOR
BY Victor J. Evans
ATTORNEY July 17, 1928.
L. JOYNER
1,677,781
CYLINDER COCK
Filed June 1, 1927    2 Sheets-Sheet 2
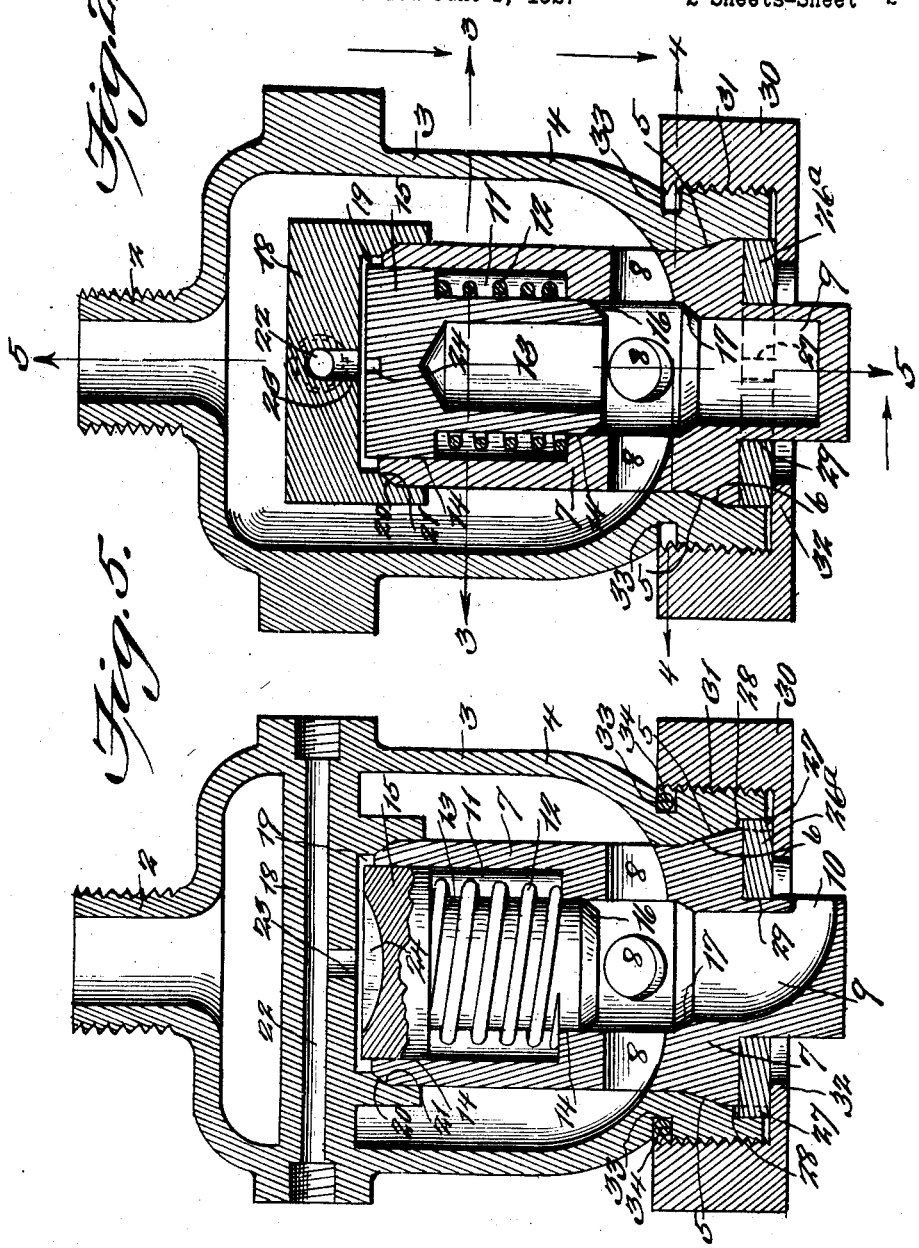
Laurie Joyner INVENTOR
BY Victor J. Evans
ATTORNEY Patented July 17, 1928.

1,677,781

UNITED STATES PATENT OFFICE.

LAURIE JOYNER, OF PHILADELPHIA, PENNSYLVANIA.

CYLINDER COCK.

Application filed June 1, 1927. Serial No. 195,760.

The present invention relates to the art of steam cylinders on locomotives, and more especially to an improved cylinder cock for use in connection with the steam cylinder.

A cylinder cock is for the purpose of releasing the water in the cylinder. Heretofore, the spring which is used for exerting tension on the valve, is exposed to the steam, and should there be any foreign matter, such as grit or particles of packing to reach the interior of the casing of the cylinder cock, such foreign matter may lodge between the convolutions of the spring, and thereby prevent compressing of the spring, when steam is allowed to enter the cylinder cock for actuating the valve therein, which is tensioned by the spring.

Therefore, it is the purpose of the present invention to provide an improved cylinder cock, and in accomplishing this result it is the aim to avoid the heretofore mentioned disadvantages.

In particular it is another purpose to provide, in a cylinder cock, a cage for housing the valve and its tensioning spring, hence preventing grit and particles of packing or other foreign matter from interfering with the compression of the spring, said cage acting to also guide the valve in its movements.

Another purpose of the invention is to provide means for mounting and supporting the cage as rising from the bottom of the interior of the cylinder cock casing, such means being capable of disassembling so that the cage may be easily removed, when it is desired to clean the interior of the cylinder cock.

A further purpose is to provide, in a cylinder cock, a construction at the bottom of the interior of the casing of the cylinder cock, as will permit the condensation of steam or water together with sediment, such as grit and particles of packing to easily and thoroughly drain off.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1—is a view in side elevation of a cylinder cock as applied to the steam cylinder of a locomotive.

Figure 2—is a vertical sectional view through the same showing the details of construction.

Figure 3—is a cross sectional view on line 3—3 of Figure 2.

Figure 4—is a sectional view on line 4—4 of Figure 2, showing the cotter keys for holding the retaining nut in place, which nut in turn houses and holds a retaining and supporting washer in position.

Figure 5—is a vertical sectional view on line 5—5 of Figure 2.

Referring to the drawings, 1 identifies a portion of a steam cylinder, into the wall of which the reduced neck 2 of the improved cylinder cock 3 is threaded. The cylinder cock comprises a casing 4 which may be any size or shape preferably as illustrated. In fact the casing is of a cylindrical contour, and at its upper end is provided with a hexagon shoulder, with which a wrench or the like may engage for screwing the casing into position.

The lower end of the casing is threaded, and the lower portion of the interior wall of the casing tapers arcuately downwardly, so that the condensation of steam may easily and very quickly drain off. Below this tapered portion, the casing is provided with an interior beveled shoulder 5, with which a similar shoulder 6 formed on the exterior of a valve cage 7 engages. The beveled shoulder 6 is formed on the lower part of the valve cage, which is hollow, and is also provided diametrical opposite portions with openings 8, which communicate with the interior of the cage. Depending from the lower end of the cage below the shoulder 6 is a reduced hollow extension 9 which is integral with the cage. This extension 9 is also hollow and has an outlet opening 10 facing toward one side of the cylinder cock. The openings 8 have their lower portions curved or arcuate as shown to conform to the curvature of the lower interior surface of the casing, to insure complete draining off of the condensation of steam together with any foreign matter.

The cage at a point above the openings 8 is interiorly enlarged providing a chamber 11 for the spring 12, which seats on the lower end wall of the chamber 11. A valve 13 is guided at 14 in the cage, and the upper end of the valve has a head 15 with the under surface of which the spring 12 engages. The valve is hollow, for the purpose of reducing the weight of the valve. The lower end of the valve has a valve face 16 which is beveled and is adapted to engage with the valve seat 17, when the valve 13 is actuated, for the purpose of preventing the escape of live steam from the steam cylinder.

The casing 4 of the cylinder cock is cast with an interior transverse wall 18 which is webbed in position. This wall is chambered out as shown at 19, which chamber has a beveled seat 20, with which the beveled upper end 21 of the cage engages. Prior to the engagement of these beveled surfaces 20 and 21, the end of the cage fits into the wall 18, the upper face of the head 15 of the valve 13 practically engages the upper inner face of the chamber 19 of said wall 18, that is when the valve is raised, which is accomplished through the action of the spring. A passage 22 is formed transversely of the casing 4 of the cylinder cock and through the wall 18, and midway of this passage a port 23 is formed, communicating with the chamber 19. The upper face of the head 15 of the valve has a transverse groove 24, the bottom of which is arcuate. This groove 24 provides space to permit the entrance of steam between the head 15 and the upper wall of the chamber 19, so that the steam can act on the head 15 of the valve and force the valve downwardly against the action of the spring 12. Suitable pipes identified by the numeral 25 are threaded into the enlarged ends of the passage 22, and these pipes are adapted to communicate with the boiler not shown. When the locomotive (not shown) is under way, steam from the single pipe 26 and the branch pipes 25 is allowed to pass into both cylinder cocks, hence when steam enters the passage 22 it depresses the valve 13 against the action of the spring 12, to cause the beveled face 16 of the valve to contact with the valve seat 17, to prevent the escape of steam, and thereby insure the full capacity of pressure of steam in the cylinder.

To support and hold the cage within the casing in an upright position and with rigidity a suitable retaining washer 26ª is inserted in the lower end of the casing 4. This retaining washer has diametrically opposite lugs 27, which engage notches 28 likewise diametrically opposite in the lower end of the casing, thereby preventing the retaining washer from rotating. The depending reduced part 9 of the cage engages through an opening 29 in the washer. To hold the washer against downward movement a retaining nut 30 is threaded at 31 to the lower end of the cylinder cock casing 4. The retaining nut has an internal annular flange 32 which overlies the lower end of the casing 4 and also overlies the washer. The reduced part 9 of the cage extends through the washer. Adjacent the upper end of the threads 31 of the casing 4 an annular groove 33 is provided, and engaging through the wall of the nut at diametrical portions thereof are cotter keys 34, which engage tangentially into the groove 33, acting materially in preventing the retaining nut from backing off. There is a slight space provided between the annular flange and the lower end of the casing 4 to provide for taking up on the nut, for the purpose of causing a close fit of the retaining washer and insuring a tight engagement of the beveled surfaces 5 and 6 as well as a tight engagement of the beveled surfaces 20 and 21, thereby preventing any undue leakage of steam.

It is obvious that the valve 13 is held elevated by the action of the spring 12, while the locomotive (not shown) is at rest. At such time the water in the cylinder drains into the casing 4 and thence through the openings 8 into the hollow reduced part 9 and passes out to the atmosphere through the opening 10. However, when the locomotive (not shown) is going ahead, steam from the single pipe 26 and the branch pipes 25 is permitted to enter both cylinder cocks. Therefore, when steam enters the passage 22 it acts upon the upper face of the valve 13, depressing it against the action of the spring 12, causing the valve 13 to engage with the seat 17 and thereby preventing the escape of steam from the cylinder 4 and insuring full pressure in the cylinder.

The invention having been set forth, what is claimed is:

1. A cylinder cock, comprising a casing having a chamber into which the condensation of steam drains, a valve cage with an open ended chamber therein and upstanding within the casing and having a drain passage to carry off the condensation of steam to the atmosphere, said cage having a valve seat, a valve operable in and mounted to close both ends of said cage chamber, a spring housed in the cage chamber and being free from contact with the steam or foreign matter therein, and associated with the valve to hold it from contact with the seat, and means for permitting the entrance of steam to act upon the top of the valve for closing it against the seat to prevent the escape of steam from the drain passage.

2. A cylinder cock for locomotive cylinders, comprising a casing, a valve cage with an open ended chamber therein and upstanding within the cage and having a drain passage communicating with the interior of the casing and the atmosphere for draining off the condensation of steam, said cage having a valve seat, a valve operable in and mounted to close both ends of said cage chamber, the chamber of the cage surrounding the valve, means housed within the cage chamber free from contact with the steam and foreign matter, and so associated with and acting to hold the valve up out of contact with its seat, and means for conducting steam to a point above the valve whereby the steam may act thereon to close the valve against the seat, and thereby prevent the escape of steam.

3. A cylinder cock for locomotive cylinders, comprising a casing having a chamber and a wall webbed transversely of the chamber, said wall having a cavity, a valve cage upstanding from the bottom of the interior of the casing and engaging in said cavity, means comprising a retaining nut and retaining washer for holding and supporting said cage in position, said cage having a passage communicating with the interior of the casing and the atmosphere for draining off condensation of steam, the cage having a valve seat, a valve operable in the cage and projecting partially into the cavity, a spring for holding the valve out of engagement with the seat and means for housing the spring and rendering it free from contact with steam and means consisting of passages for conducting steam to the cavity to act upon the top of the valve for closing it against its seat.

4. A cylinder cock for locomotive cylinders, comprising a casing having a chamber and a wall webbed transversely of the chamber, said wall having a cavity, a valve cage up-standing from the bottom of the interior of the casing and engaging in said cavity, means comprising a retaining nut and retaining washer for holding and supporting said cage in position, said cage having a passage communicating with the interior of the casing and the atmosphere for draining off condensation of steam, the cage having a valve seat, a valve operable in the cage and projecting partially into the cavity, a spring for holding the valve out of engagement with the seat, and means for housing the spring and rendering it free from contact with steam, and means consisting of passages for conducting steam to the cavity to act upon the top of the valve for closing it against its seat, and means to prevent rotation of the washer.

5. A cylinder cock for locomotive cylinders, comprising a casing having a chamber and a wall webbed transversely of the chamber, said wall having a cavity, a valve cage up-standing from the bottom of the interior of the casing and engaging in said cavity, means comprising a retaining nut and retaining washer for holding and supporting said cage in position, said cage having a passage communicating with the interior of the casing and the atmosphere for draining off the water, the cage having a valve seat, a valve operable in the cage and projecting partially into the cavity, a spring for holding the valve out of engagement with the seat, and means for housing the spring and rendering it free from contact with steam, and means consisting of passages for conducting steam to the cavity to act upon the top of the valve for closing it against its seat, and means to prevent rotation of the washer, and means to prevent rotation of the retaining nut.

6. In a cylinder cock for locomotive steam cylinders, the combination with a casing having a chamber, of a valve cage upstanding from the bottom of said interior of the casing and having a passage communicating with the interior of the casing and the atmosphere for permitting the draining off of the condensation of steam, said cage having a chamber and a valve seat, a valve operable and guided within the cage chamber for engaging with the seat, a spring within the cage chamber and surrounding the valve and holding the latter out of contact with the seat, both ends of the cage chamber being closed by the valve to protect the spring from contact with the steam, and passages constructed through the casing for conducting steam to a point above and in contact with the valve for closing it, means comprising a retaining washer and a retaining nut for supporting the cage in its upstanding position, means to prevent rotation of the washer, and means to prevent rotation of the retaining nut.

7. In a cylinder cock for locomotive steam cylinders, a casing having a chamber for communication with the cylinder and having a drain outlet passage, a valve cage provided with an open ended chamber, a valve operable in and mounted for closing both ends of the cage chamber, tensioning means within the cage chamber and protected from contact with the steam due to the mounting of both ends of the valve, and means conducting steam into the top of the cage chamber and permitting it to act upon and for closing the valve.

8. In a cylinder cock for locomotive steam cylinders, a casing having a chamber for communication with the cylinder and having a drain outlet passage, a valve cage provided with an open ended chamber, a valve operable in and mounted for closing both ends of the cage chamber, tensioning means within the cage chamber and protected from contact with the steam due to the mounting of both ends of the valve, and means conducting steam into the top of the cage chamber and permitting it to act upon and for closing the valve, and means cooperating with the lower end of the cage and the lower end of the casing for mounting the cage upstanding in the chamber of the casing.

9. In a cylinder cock for steam clyinders, a casing provided with a chamber, a cage operatively mounted therein and having an open ended valve chamber and a seat, a valve operatively mounted in the valve chamber, both ends of the valve chamber being closed by the valve, means in surrounding relation to the valve and mounted in the valve chamber for retaining the valve out of contact with the seat, means conducting steam to the valve chamber and adapted to act on the valve for closing the same.

10. A cylinder cock for steam cylinders, a casing having a chamber, a valve cage therein including a valve chamber, a valve operative in the valve chamber and adapted for closing a seat at the lower part of the cage, means for tensioning the valve to retain it out of engagement with said seat, the cage and the valve having cooperating means for guarding and protecting the tensioning means from contact with the steam, means conducting fluid into the valve chamber for acting upon the valve to close it against its seat.

11. In a cylinder cock for steam cylinders, a casing provided with a chamber, a valve cage within said chamber and having a seat, a resiliently mounted valve in the cage for cooperation with the seat, means conducting fluid within the cage for acting upon the valve for closing it against the seat, the lower portion of the cage having a drain and provided with an exterior tapered head, said casing having an opening in its bottom with its wall constructed to cooperate with and being engaged by the head, means operatively connected with the lower end of the casing and having cooperative connections with the head for supporting the cage in an upstanding position within the chamber of the casing.

12. In a cylinder cock for steam cylinders, a casing provided with a chamber, a valve cage within said chamber and having a seat, a resiliently mounted valve in the cage for cooperation with the seat, means conducting fluid within the cage for acting upon the valve for closing it against the seat, the lower portion of the cage having a drain and provided with an exterior tapered head, said casing having an opening in its bottom with its wall constructed to cooperate with and being engaged by the head, means operatively connected with the lower end of the casing and having cooperative connections with the head for supporting the cage in an upstanding position within the chamber of the casing, a packing element interposed between the head and the lower portion of the last named means to insure said cooperative connections with the head, and means for locking the last named means to said casing.

13. A cylinder cock for steam cylinders, a casing having a chamber, a valve cage therein including a valve chamber, a valve operative in the valve chamber and adapted for closing a seat at the lower part of the cage, means for tensioning the valve to retain it out of engagement with said seat, the cage and the valve having cooperating means for guiding and protecting the tensioning means from contact with the steam, means conducting fluid into the valve chamber for acting upon the valve to close it against its seat, means for supporting the cage upright in the casing.

14. In a cylinder cock for locomotive steam cylinders, a casing having a chamber for communication with the cylinder and having a drain outlet passage, a valve cage provided with an open ended chamber, a valve operable in and mounted for closing both ends of the cage chamber, tensioning means within the cage chamber and protected from contact with the steam due to the mounting of both ends of the valve, and means conducting steam into the top of the cage chamber and permitting it to act upon and for closing the valve, and means to support the valve cage from the lower end of the casing.

In testimony whereof, he affixes his signature.

LAURIE JOYNER.